United States Patent [19]

Wu

[11] Patent Number: 4,978,175
[45] Date of Patent: Dec. 18, 1990

[54] DEVICE FOR COUPLING A WHEEL TO A GOLF CLUB CARRIER

[75] Inventor: Jiin-Chang Wu, Taipei, Taiwan

[73] Assignee: Masters Cy Industrial Co., Ltd., Taipei Hsien, Taiwan

[21] Appl. No.: 440,654

[22] Filed: Nov. 22, 1989

[51] Int. Cl.$^5$ .......................... B60B 35/02; B60B 37/10
[52] U.S. Cl. .................................... 301/121; 301/111; 301/131; 301/119
[58] Field of Search ............... 301/111, 112, 114, 121, 301/122, 124 R, 131, 1, 115, 118, 119, 125, 126, 128

[56] References Cited

U.S. PATENT DOCUMENTS

| | | | |
|---|---|---|---|
| 672,031 | 4/1901 | Clouse | 301/121 |
| 838,630 | 12/1906 | Lewis, Jr. | 301/121 |
| 1,188,337 | 6/1916 | Siebert et al. | 301/122 |
| 1,431,242 | 10/1922 | Lindberg | 301/121 X |
| 2,175,646 | 10/1939 | Replogle | 301/1 X |
| 2,275,302 | 3/1942 | Magnuson | 301/128 X |
| 4,400,038 | 8/1983 | Hosokawa | 301/125 X |

FOREIGN PATENT DOCUMENTS 379410  11/1907  France ................. 301/119

Primary Examiner—Russell D. Stormer
Attorney, Agent, or Firm—Eckert Seamans Cherin & Mellott

[57] ABSTRACT

A device for coupling a wheel to a golf club carrier includes a sleeve member axially and rotatably passed through the axle of the wheel. A head portion with a tongue is formed at an end of the sleeve member. Two lugs parallelly extend from the free end of the leg of the golf club carrier. A fixing rod has a first end connected to the leg of the golf club carrier near the free end of the leg and a second end passing through the head portion of the sleeve member into the sleeve member. A plurality of radial ribs extend outwardly near the first end of the fixing rod and are correspondingly fitted into a plurality of radial grooves formed in the head portion of the sleeve member so as to prevent the fixing rod from rotation relative to the sleeve member when the fixing rod is received in the sleeve member. A lever with a clamping head is pivoted between the two lugs so that the tongue of the sleeve member can be clamped between the leg of the golf club carrier and the lever when the lever is depressed toward the free end of the leg of the golf club carrier.

3 Claims, 3 Drawing Sheets

DEVICE FOR COUPLING A WHEEL TO A GOLF CLUB CARRIER

BACKGROUND OF THE INVENTION

This invention relates to a coupling device, more particularly to a device for coupling a wheel to a leg of a golf club carrier.

Referring to FIGS. 1 and 2, a conventional device for coupling a wheel (D) to a leg of a golf club carrier (F) includes a sleeve member (A) rotatably passed through the hub (Dl) of the wheel (D). The sleeve member (A) has an annular groove (Al) formed at one end thereof, to which a split ring (R) is clamped, and a hollow head portion (A2) formed at the other end thereof so that said wheel (D) can be prevented from separating from said sleeve member (A). A fixing rod (B) is connected to the leg of the golf club carrier (F) at a threaded end (b2) thereof and passed through said hollow head portion (A2) of the sleeve member (A) and into said sleeve member (A) from the lower side of said hollow head portion (A2) to the upper side of said hollow head portion (A2). A screw bolt (C2), on which a coiled spring (Cl) is sleeved, passes through the hollow head portion (A2) so as to fasten said fixing rod (B) in the sleeve member (A). However, said conventional coupling device suffers from the following disadvantages:

(1) It is difficult for a user to turn the screw bolt (C2) from the bottom side of the hollow head portion (A2) to the upper side of the hollow head portion (A2) during the assembling process, causing frequent improper threading of the screw bolt (C2).

(2) Since the sleeve member (A) is usually made of a plastic material, the internal threads formed in the hollow head portion (A2) are liable to be damaged by any improperly threading of the screw bolt (C2).

SUMMARY OF THE INVENTION

It is therefore a main object of this invention to provide a device for coupling a wheel to a golf club carrier which will not be damaged by a screw bolt during assembly.

It is another object of this invention to provide a device for coupling a wheel to a golf club carrier, in which said wheel can be easily and quickly mounted to and removed from the golf club carrier.

Accordingly, a device for coupling a wheel to a golf club carrier of this invention includes a sleeve member axially and rotatably passed through the axle of said wheel. The sleeve member has an annular groove formed at a first end thereof to which a retaining member is clamped and a head portion formed at a second end thereof so that the wheel can be prevented from separating from the sleeve member. The head portion of the sleeve member has a tongue extending axially and outwardly therefrom and a central axial bore having a plurality of radial grooves outwardly extending therefrom. Two lugs parallelly extend from the free end of a leg of said golf club carrier. A fixing rod, which is positioned generally perpendicular to the lugs, has a first end connected to the leg of the golf club carrier, near the free end of said leg, and a second end passing through the central axial bore of the head portion of the sleeve member into the sleeve member so that the tongue of said sleeve member can be extended between said lugs and adjacent to the free end of said leg of the golf club carrier. A plurality of radial ribs extend outwardly near the first end of the fixing rod and are correspondingly fitted into the radial grooves of the sleeve member so as to prevent the rotation thereof relative to said sleeve member when the fixing rod is received in the sleeve member. A lever with a clamping head is pivoted between the two lugs so that the tongue of the sleeve member can be clamped between the free end of the leg of the golf club carrier and the clamping head of said lever when said lever is depressed toward the free end of the leg of said golf club carrier. Therefore, the wheel can be easily and quickly mounted to and removed from the leg of the golf club carrier by means of manually rotating the lever to either clamp or release the tongue of the sleeve member without the need of threading a screw bolt.

BRIEF DESCRIPTION OF THE DRAWINGS

Other features and advantages of this invention will become apparent in the following detailed description of a preferred embodiment of this invention with reference to the accompanying drawings, in which.

DETAILED DESCRIPTION OF THE PREFERRED EMBODIMENTS

Figure 1:
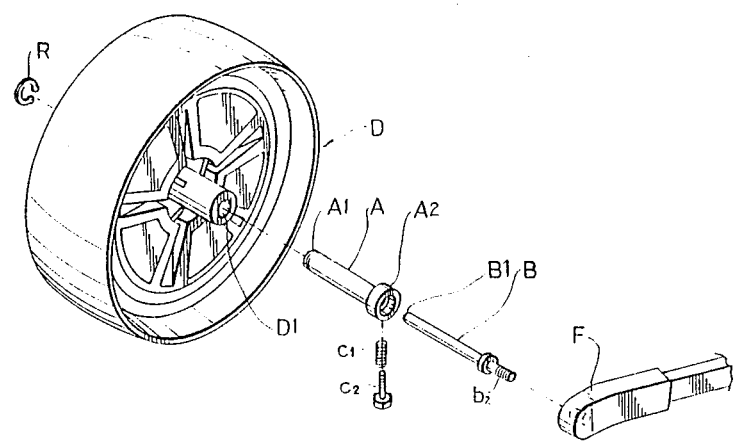
FIG. 1 is a perspective exploded view of a conventional device for coupling a wheel to a leg of a golf club carrier.
Figure 2:
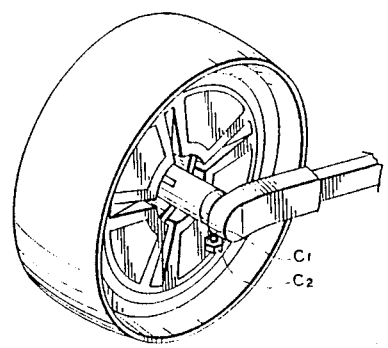
FIG. 2 is a perspective schematic view showing a wheel being coupled to a leg of golf club carrier by utilizing the conventional coupling device of FIG. 1.
Figure 3:
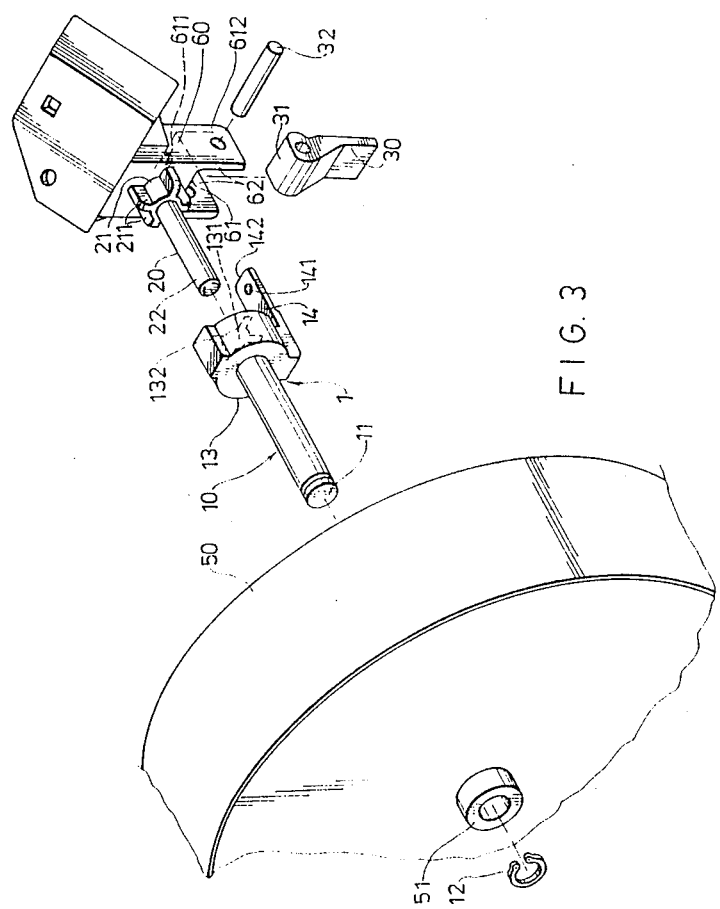
FIG. 3 is a perspective exploded view of a device for coupling a wheel to a golf club carrier of this invention.

Referring to FIG. 3, a device for coupling a wheel 50 to a leg 60 of a golf club carrier includes a sleeve member 10 axially and rotatably passed through the hub 51 of said wheel 50. The sleeve member 10 has an annular groove 11 formed at one end thereof, to which a split retaining ring 12, is clamped and a head portion 13 formed at the other end thereof so that the wheel 50 can be prevented from separating from said sleeve member 10. The head portion 13 of the sleeve member 10 has a tongue 14 extending axially and outwardly therefrom. A central axial bore 131, from which four equally spaced radial grooves 132 outwardly extend, is axially formed in the head portion 13.

Two lugs 62 parallelly extend from the free end 61 of a leg 60 of a golf club carrier. A fixing rod 20, which is positioned generally perpendicular to the lugs 62, has a first end 21 connected to the leg 60 of the golf club carrier near the free 61 end of said leg 60 and a second end 22 passing through the central axial bore 131 of the head portion 13 of the sleeve member 10 into said sleeve member 13 so that the tongue 14 of the said sleeve member 10 can be extended between said lugs 62 so as to be adjacent to the free end 61 of said leg 60 of said golf club carrier. Four equally spaced radial ribs 211 extend outwardly near the first end 21 of the fixing rod 20 and are correspondingly fitted into the radial grooves 132 of the sleeve member 10 so as to prevent the rotation thereof relative to the sleeve member 10 when the fixing rod 20 is received in said sleeve member 10. A hole 142 is formed in the tongue 14 of the sleeve member 10 and a protrusion 611 extends from the free end 61 of the leg 60 of the golf club carrier so that said protrusion 611 can be inserted into said hole 142 of said tongue 14 when said tongue 14 is extended between the lugs 62 for positioning purposes.

Figure 4:
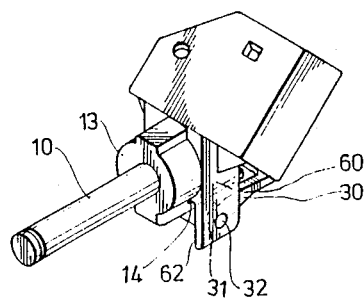
FIG. 4 is a perspective exploded view showing a device for coupling a wheel to a golf club carrier of this invention in an assembled position.
Figure 5:
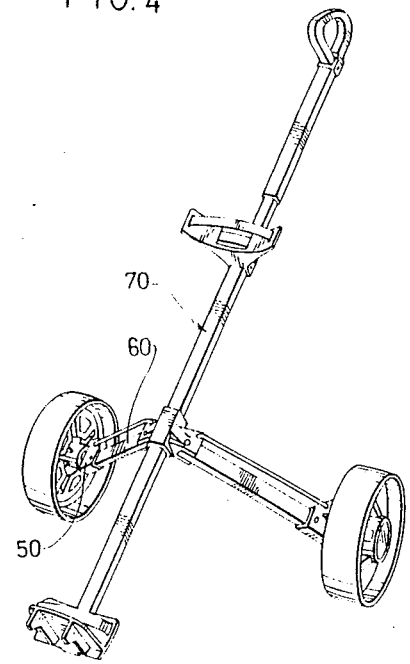
FIG. 5 is a perspective schematic view showing a wheel being mounted to a golf club carrier by utilizing the coupling device of this invention.

A lever 30 with a clamping head 31 is pivoted between the two lugs 62 by a pin 32 so that the tongue 14 of the sleeve member 10 can be clamped between the free end 61 of the leg 60 of the golf club carrier and the clamping head 31 of the lever 30 as said lever is depressed toward the free end 61 of said leg 60 of said golf club carrier, as best illustrated in FIG. 4. In this way, the wheel 50 can be easily and quickly mounted to the leg 60 of the golf club carrier 70 without the need of screws, as best illustrated in FIG. 5. Inversely, the wheel 50 can be easily and quickly removed from the leg 60 of the golf club carrier 70 by rotating the lever 30 away from said leg 60 of said golf club carrier 70, so as to release the tongue 14 of the sleeve member, and by separating the hole 142 in said tongue 14 from the protrusion 611 of said leg 60. It is noted that since no screws are required in the coupling device of the present invention, the parts of said coupling device of this invention will not be damaged during assembly and therefore, the present coupling device is more durable than a conventional coupling device which uses screw bolts to position the parts thereof.

With this invention thus explained, it is apparent that numerous modifications and variations can be made without departing from the scope and spirit of this invention. It is therefore intended that this invention be limited only as indicated in the appended claims.

I claim:

1. A device for coupling a wheel to a leg of a golf club carrier comprising:

a sleeve member axially and rotatably passed through an axle of said wheel, said sleeve member having an annular groove formed at a first end thereof, to which a retaining member is clamped, and a head portion formed at a second end thereof so that said wheel can be prevented from separating from said sleeve member, said head portion of said sleeve member having a tongue extending axially and outwardly therefrom and a central axial bore having a plurality of radial grooves outwardly extend therefrom;

two lugs parallelly extending from a free end of said leg of said golf club carrier;

a fixing rod, which is generally perpendicular to said lugs, having a first end connected to said leg of said golf club carrier, near said free end of said leg, and a second end passing through said central axial bore of said head portion of said sleeve member into said sleeve member so that said tongue of said sleeve member can be extended between said lugs so as to be adjacent to said free end of said leg of said golf club carrier, said fixing rod having a plurality of radial ribs extending therefrom near said first end thereof which are correspondingly fitted into said radial grooves of said sleeve member so as to prevent a rotation thereof relative to said sleeve member when said fixing rod is received in said sleeve member; and a lever having a clamping head pivoted between said two lugs so that said tongue of said sleeve member can be clamped between said free end of said leg of said golf club carrier and said clamping head of said lever when said lever is depressed toward said free end of said leg of said golf club carrier.

2. A device for coupling a wheel to a leg of a golf club carrier as claimed in claim 1, wherein said tongue of said sleeve member has a hole formed therein and said free end of said leg of said golf club carrier has a protrusion extending therefrom so that said protrusion can be inserted into said hole of said tongue when said tongue is extended between said lugs.

3. A device for coupling a wheel to a leg of a golf club carrier as claimed in claim 1, wherein said fixing rod has four equally spaced radial ribs extending therefrom near said free end of said golf club carrier.

* * * * *